United States Patent
Li et al.

(10) Patent No.: US 12,478,485 B2
(45) Date of Patent: Nov. 25, 2025

(54) PREPARATION METHOD OF A HIP JOINT BONE CEMENT PLACEHOLDER

(71) Applicant: The Third Affiliated Hospital, Guangzhou Medical University (GZ Critical Pregnant Women Center), Guangdong (CN)

(72) Inventors: Yuanhui Li, Guangdong (CN); Meilin Li, Guangdong (CN); Miandong Zeng, Guangdong (CN)

(73) Assignee: The Third Affiliated Hospital, Guangzhou Medical University (GZ Critical Pregnant Women Center), Guangdong (CN)

( * ) Notice: Subject to any disclaimer, the term of this patent is extended or adjusted under 35 U.S.C. 154(b) by 0 days.

(21) Appl. No.: 19/259,049

(22) Filed: Jul. 3, 2025

(65) Prior Publication Data
US 2025/0352364 A1  Nov. 20, 2025

Related U.S. Application Data

(63) Continuation of application No. PCT/CN2024/096306, filed on May 30, 2024.

(30) Foreign Application Priority Data

May 14, 2024 (CN) .......................... 202410595090.7

(51) Int. Cl.
*A61F 2/20* (2006.01)
*A61F 2/30* (2006.01)
(Continued)

(52) U.S. Cl.
CPC .......... *A61F 2/4684* (2013.01); *A61F 2/3094* (2013.01); *A61F 2/36* (2013.01);
(Continued)

(58) Field of Classification Search
CPC ........ A61F 2/4684; A61F 2/3094; A61F 2/36; A61F 2310/00353; B33Y 50/00; B33Y 80/00; B33Y 10/00
See application file for complete search history.

(56) References Cited

U.S. PATENT DOCUMENTS

| 5,133,771 | A | * | 7/1992 | Duncan | A61F 2/36 264/DIG. 30 |
| 5,980,573 | A | * | 11/1999 | Shaffner | A61F 2/36 623/908 |
| 2015/0093283 | A1 | * | 4/2015 | Miller | B23K 15/0086 264/109 |

FOREIGN PATENT DOCUMENTS

| CN | 201664350 U | 12/2010 |
| CN | 108784889 A | 11/2018 |

(Continued)

*Primary Examiner* — Christina A Johnson
*Assistant Examiner* — Kelsey C Grace
(74) *Attorney, Agent, or Firm* — Rondaus PLLC; George Liu

(57) ABSTRACT

Disclosed are a metal inner core, a placeholder and a preparation method for a hip joint bone cement placeholder. By designing the metal inner core including a frame body and a supporting portion inside the hip joint bone cement placeholder, the strength of the placeholder is enhanced; due to the fact that the metal inner core is hollow, the antibiotic bone cement can fill the inner portion of the metal inner core, the content of antibiotics in the placeholder cannot be affected, and infection is effectively controlled; the hollowed-out structure endows the placeholder with lighter weight and stronger structural strength, and meanwhile, the material cost is effectively reduced; and according to the preparation method of the hip joint bone cement placeholder, the size design of the placeholder and the metal inner core is carried out, so that the joint matching degree between the placeholder and the patient is high.

6 Claims, 8 Drawing Sheets

(51) Int. Cl.
    *A61F 2/36*    (2006.01)
    *A61F 2/46*    (2006.01)
    *B33Y 50/00*   (2015.01)
    *B33Y 80/00*   (2015.01)
    *B33Y 10/00*   (2015.01)
(52) U.S. Cl.
    CPC ............... *B33Y 50/00* (2014.12); *B33Y 80/00* (2014.12); *A61F 2310/00353* (2013.01); *B33Y 10/00* (2014.12)

(56)   References Cited

FOREIGN PATENT DOCUMENTS

| CN | 209474873 U | 10/2019 |
| CN | 111249041 A | 6/2020 |
| CN | 111297519 A | 6/2020 |
| CN | 111839818 A | 10/2020 |
| CN | 211750285 U | 10/2020 |
| CN | 118000978 A | 5/2024 |

\* cited by examiner

Step 1
preparing a placeholder model
obtaining hip joint prosthesis contour data, performing reduction adjustment of 10%-15% of hip joint prosthesis contour data to obtain contour data of the placeholder model, and obtaining contour data of the placeholder model for 3D printing to obtain the placeholder model Step 2
preparing a reverse mold
carrying out reverse mode design according to contour data of the placeholder model, obtaining size data of the reverse mold, taking ABS resin as a stacking material, obtaining size data of the reverse mold for 3D printing to obtain the reverse mold comprising a first mold and a second mold Step 3
preparing a metal inner core
performing reduction adjustment of 18%-25% of contour data of the placeholder model to obtain contour data of the metal inner core, and obtaining contour data of the metal inner core for 3D printing to obtain the metal inner core Step 4
preparing a bone cement placeholder
putting the metal inner core into the first mold or the second mold, filling liquid antibiotic bone cement in the first mold with the metal inner core or the second mold with the metal inner core, wherein the first mold without the metal inner core or the second mold without the metal inner core needs to be filled with liquid antibiotic bone cement, tightly buckling the first mold and the second mold, and separating the first mold from the second mold after waiting for solidification to obtain the bone cement placeholder

Fig. 6

PREPARATION METHOD OF A HIP JOINT BONE CEMENT PLACEHOLDER

CROSS-REFERENCE TO RELATED APPLICATIONS

This application is a continuation of International Application No. PCT/CN2024/096306, filed on May 30, 2024, which claims priority to Chinese Patent Application No. 202410595090.7, filed on May 14, 2024. All of the aforementioned applications are incorporated herein by reference in their entireties.

TECHNICAL FIELD

The present disclosure belongs to the technical field of medical auxiliary devices, and in particular relates to a preparation method of a hip joint bone cement placeholder.

BACKGROUND

When chronic joint diseases such as severe hip osteoarthritis, hip rheumatoid arthritis, and advanced avascular necrosis of the femoral head, as well as senile femoral neck fractures, lead to severe pain, functional impairment, and reduced quality of life, joint replacement surgery is typically necessary.

Periprosthetic infection after joint replacement surgery is one of the most serious complications of such surgery. Currently, the treatment options for bone infection mainly include debridement, one-stage revision surgery, and two-stage revision surgery. The first-stage revision refers to the complete debridement and completion of the implantation of the new prosthesis during the first-stage surgery. The second-stage revision refers to the complete debridement and placement of a placeholder during the first-stage placement surgery. After the infection is controlled, the second-stage surgery is performed to remove the placeholder and simultaneously conduct hip prosthesis revision. This two-stage revision surgery method, which involves placing an antibiotic bone cement placeholder, has an infection control effectiveness rate of over 90% and is recognized as the "gold standard" both domestically and internationally.

Among the existing hip joint placeholder manufacturing technologies, there are methods of hand-kneaded antibiotic bone cement placeholders, mold-pressed placeholders, and perfusion-irrigated placeholders. The advantages of the hand-kneaded antibiotic bone cement placeholder are: it allows a certain degree of mobility of the affected hip after placement, can restore the length of the lower limb and the tension of the position tissue, and the placeholder can be removed during the second-stage revision; and the disadvantages are: it is difficult to control the shape during the kneading process, the surface is not smooth, and the prosthesis is prone to dislocation. The mold-pressed placeholder method has the advantages of simple production, smooth surface, and low cost, and solves some of the shortcomings of the hand-kneaded placeholder. However, this type of placeholder has limited specifications, usually only large, medium, and small sizes, making it difficult to meet the needs of individual patients The advantage of the perfusion-irrigated placeholder method is that it can maintain joint function during the period of non-implantation after the removal of the infected focus. However, the disadvantages are that the gaps in the placeholder can easily be blocked by blood clots and tissues, affecting its effectiveness, and it does not allow weight-bearing walking.

In addition, the placeholder manufactured by the three methods can be broken when the limb load exceeds the load, and the existing publication number CN209004338U discloses novel antibiotic bone cement placeholder, comprising a placeholder body and a reinforcing framework arranged in the placeholder body, the placeholder body is made of an antibiotic bone cement material, and the reinforcing framework is a bent arc-shaped metal nail.

Thielen and other scholars measured the ultimate loads that the solid supporting metal, titanium needle, and titanium plate at the center of the placeholder can withstand by using biomechanics, which are 400-600N, 1100-1300N, and 2380-4811N, respectively. At the same time, he also proposed that to fully bear weight, the diameter of the all-titanium metal core should reach 8 mm. Although the patent with the publication number of CN209004338U discloses novel antibiotic bone cement placeholder that uses a 4 mm diameter Steinmann pin bent to 130° as a reinforcing framework to ensure the strength of the placeholder, novel antibiotic bone cement placeholders such as the one disclosed in the patent with the publication number of CN209004338U cannot fully bear weight, and there is still a risk of fracture when the load exceeds the limit during limb loading. Further, scholars such as Nobuhiro Kaku believe that increasing the metal diameter to enhance the strength of the placeholder will affect the antibiotic content, and practice has proven that it is difficult to bend a metal rod with a thicker diameter during surgery, and thickening the metal rod will directly result in an increase in weight. Therefore, although the solid supporting metal, titanium needles, and titanium plates currently attempted in the prior art have a certain strengthening effect to a certain extent, their respective shortcomings are still obvious.

Therefore, how to enhance the strength of the placeholder while ensuring the antibiotic content is a technical problem that needs to be solved by those skilled in the art.

SUMMARY

In order to solve the technical problems that the existing placeholders are not strong enough and are prone to breakage, and the built-in metal of the existing placeholders affects the content of antibiotics, the present disclosure provides a metal inner core for a hip joint bone cement placeholder, and a hip joint bone cement placeholder and preparation method.

The technical solution of the present disclosure is:

the present disclosure discloses a metal inner core for a hip joint bone cement placeholder, comprising a frame body and a supporting portion, the supporting portion is arranged in the frame body, the supporting portion and the frame body integrally form a hollow metal inner core, and the frame body and the supporting portion are both made of metal materials.

Further, the frame body is provided with a plurality of hollow holes, and an area of each of the plurality of hollow holes is less than or equal to 1.5 square millimeters.

Further, the supporting portion includes a plurality of connecting rods, a supporting node is formed in a center of the plurality of connecting rods in a crossed mode, and two ends of one of the plurality of connecting rods are fixedly connected to an inner wall of the frame body.

The present disclosure discloses a hip joint bone cement placeholder, comprising the above-mentioned metal inner core for the hip joint bone cement placeholder and an antibiotic bone cement shell, the antibiotic bone cement shell wraps the metal inner core, and a volume of the metal inner core is 50%-80% of a volume of the antibiotic bone cement shell.

The present disclosure also discloses a preparation method of a hip joint bone cement placeholder, being used for preparing the above-mentioned hip joint bone cement placeholder, and comprises the following steps:

Step 1, preparing a placeholder model
obtaining joint prosthesis contour data, performing reduction adjustment of 10%-15% of joint prosthesis contour data to obtain contour data of the placeholder model, and obtaining contour data of the placeholder model for 3D printing to obtain the placeholder model;

Step 2, preparing a reverse mold
carrying out reverse mode design according to contour data of the placeholder model, obtaining size data of the reverse mold, taking ABS resin as a stacking material, obtaining size data of the reverse mold for 3D printing to obtain the reverse mold comprising a first mold and a second mold;

Step 3, preparing a metal inner core
performing reduction adjustment of 18%-25% of contour data of the placeholder model to obtain contour data of the metal inner core, and obtaining contour data of the metal inner core for 3D printing to obtain the metal inner core; and Step 4, preparing a bone cement placeholder
putting the metal inner core into the first mold or the second mold, filling liquid antibiotic bone cement in the first mold with the metal inner core or the second mold with the metal inner core, wherein the first mold without the metal inner core or the second mold without the metal inner core needs to be filled with liquid antibiotic bone cement, tightly buckling the first mold and the second mold, and separating the first mold from the second mold after waiting for solidification to obtain the bone cement placeholder.

Further, in Step 1, the hip joint prosthesis is divided into a head portion, a neck portion and a handle portion; and the steps includes obtaining hip joint prosthesis contour data, performing 15% reduction adjustment on the head contour data and the handle contour data of the hip joint prosthesis, keeping the neck contour data unchanged, obtaining contour data of the placeholder model, and obtaining contour data of the placeholder model for 3D printing to obtain the placeholder model.

Further, in Step 3, the placeholder model is further divided into a head portion, a neck portion and a handle portion; and the steps includes performing 20% reduction adjustment on the head contour data and the handle contour data of the placeholder model, keeping the neck data unchanged, obtaining contour data of the metal inner core, and obtaining contour data of the metal inner core for 3D printing to obtain the metal inner core.

Further, in Step 2, the first mold and the second mold both include a plurality of heat dissipation holes and a plurality of recessed positions, the first mold or the second mold is provided with a plurality of connecting holes, and the first mold or the second mold is provided with a plurality of connecting columns; the connecting holes and the connecting columns are arranged at an included angle of the first mold or the second mold, and the connecting holes and the connecting columns are symmetrically arranged; and one of the plurality of heat dissipation holes is provided around one of the plurality of recessed positions, and one of the plurality of connecting columns is detachably installed in one of the plurality of connection holes.

Further, in Step 4, before filling the liquid antibiotic bone cement into the first mold with the metal inner core or the second mold with the metal inner core, a layer of Vaseline is first applied to the first mold and the second mold.

Further, in Step 4, the liquid antibiotic bone cement includes bone cement powder, bone cement monomer liquid and antibiotics, wherein a weight ratio of bone cement powder, bone cement monomer liquid and antibiotics is 100:50:9, and the mixture is stirred for 60 s, so that the bone cement powder, the bone cement monomer liquid and the antibiotics are fully mixed.

The beneficial effects of the present disclosure are:
by designing the metal inner core including a frame body and a supporting portion inside the hip joint bone cement placeholder, the strength of the placeholder is enhanced; further, due to the fact that the metal inner core is hollow, on the one hand, the antibiotic bone cement can fill the inner portion of the metal inner core, the content of antibiotics in the placeholder cannot be affected, and infection is effectively controlled; on the other hand, the hollowed-out structure endows the placeholder with lighter weight and stronger structural strength, and meanwhile, the material cost is effectively reduced; the preparation method includes the steps of preparing a placeholder model, preparing a reverse mold, preparing a metal inner core, and preparing a hip joint bone cement placeholder; and according to the preparation method of the hip joint bone cement placeholder, the size design of the placeholder and the metal inner core is carried out, so that the joint matching degree between the placeholder and the patient is high, the risk of dislocation of the placeholder is reduced, the preparation method is simple, the placeholder obtained according to the preparation method is sufficiently smooth, and the movement function of the hip joint is improved.

BRIEF DESCRIPTION OF THE DRAWINGS

FIG. 6 is a schematic diagram of a preparation method of a hip joint bone cement placeholder;

DETAILED DESCRIPTION OF THE EMBODIMENTS

In order to make the technical problems, technical solutions and beneficial effects to be solved by the present disclosure more clear, the present disclosure will be further described in detail below with reference to the accompanying drawings and embodiments. It should be understood that the specific embodiments described here are only used to explain the present disclosure, and are not intended to limit the present disclosure.

Figure 1:
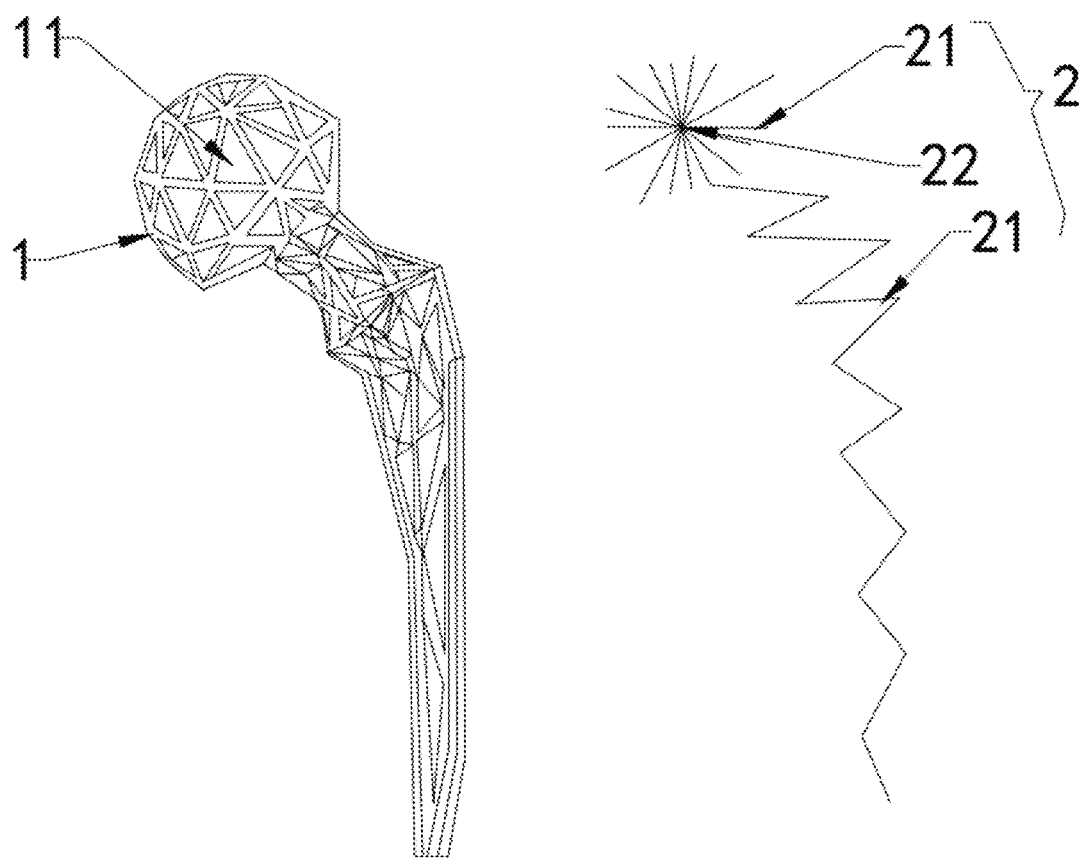
FIG. 1 is a schematic diagram of an exploded structure of a metal inner core for a hip joint bone cement placeholder according to the present disclosure.
Figure 2:
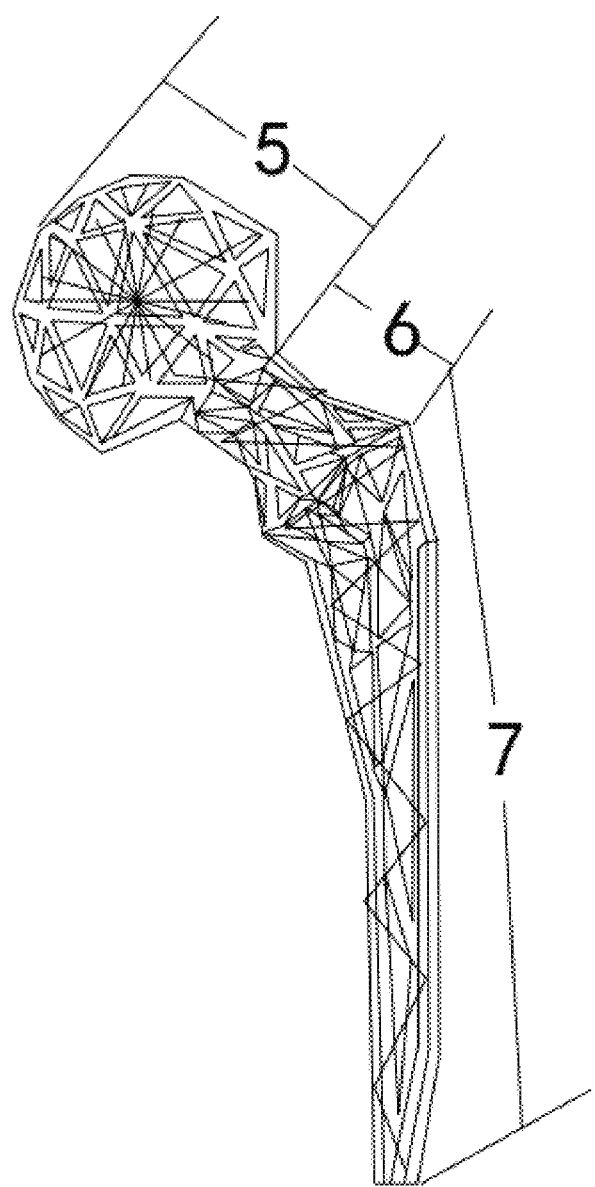
FIG. 2 is a schematic diagram of partitions of a head portion, neck portion and handle portion of a metal inner core of a hip joint bone cement placeholder according to the present disclosure.

Please refer to FIGS. 1 and 2, the present disclosure provides a metal inner core for a hip joint bone cement placeholder, comprising a frame body 1 and a supporting portion 2, the supporting portion 2 is arranged in the frame body 1, the supporting portion 2 and the frame body 1 integrally form a hollow metal inner core, and the frame body 1 and the supporting portion 2 are both made of metal materials. The hollowed-out structure endows the placeholder with lighter weight and stronger structural strength, and meanwhile, the material cost is effectively reduced.

Further, the frame body 1 is provided with a plurality of hollow holes 11, and an area of each of the plurality of hollow holes 11 is less than or equal to 1.5 square millimeters. Limiting the area of each of the plurality of hollow holes 11 can increase the hardness of the overall structure on the one hand, and facilitate the filling of bone cement into the inner portion of the metal core on the other hand.

Referring to FIG. 1, the supporting portion 2 includes a plurality of connecting rods 21, a supporting node 22 is formed in a center of the plurality of connecting rods 21 in a crossed mode, and two ends of one of the plurality of connecting rods 21 are fixedly connected to an inner wall of the frame body 1. The hardness of the metal core is enhanced through the connecting rod 21, which prevents the placeholder with the metal core from breaking after it is installed in patients.

Referring to FIG. 2, the frame body 1 is divided into a head portion, a neck portion and a handle portion, an outline of the frame body 1 is a quasi-femoral shape, the head portion is in a circular shape, the neck portion is in a columnar shape, and the handle portion is in a circular truncated cone shape or a cone shape.

Figure 3:
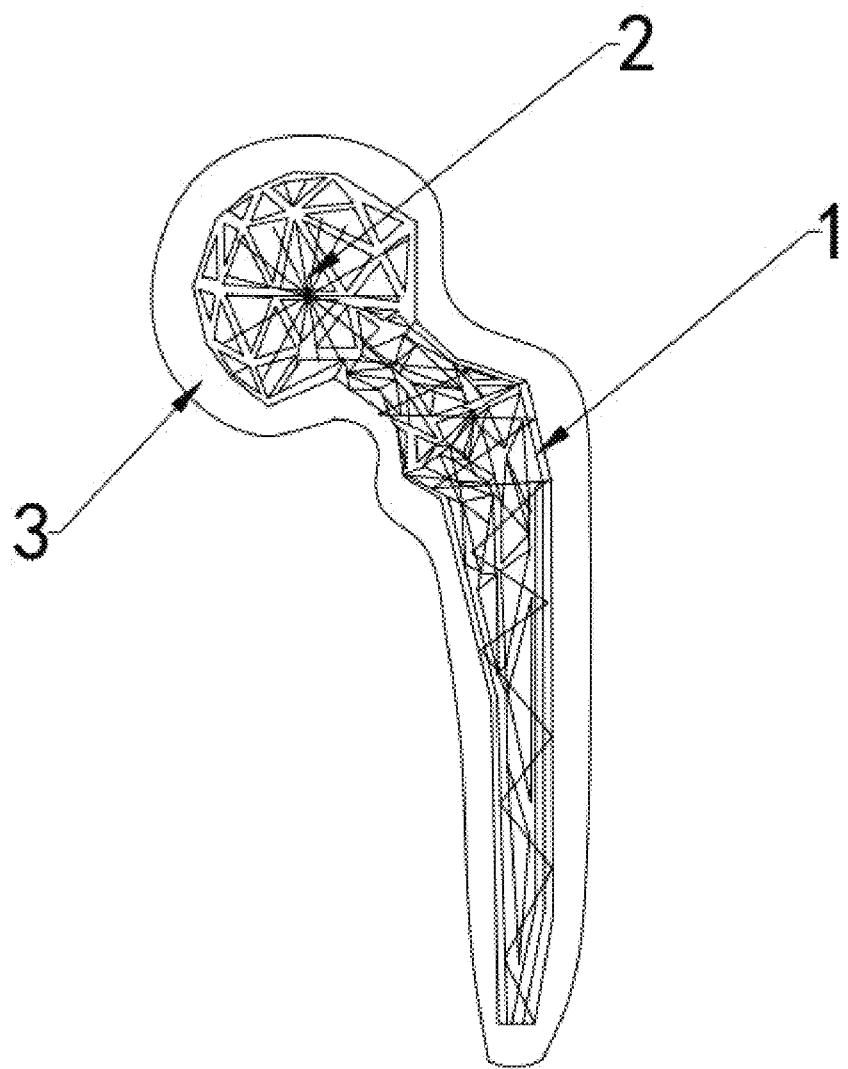
FIG. 3 is a schematic diagram of a back three-dimensional structure of a metal inner core for a hip joint bone cement placeholder, a bone cement placeholder and a preparation method according to the present disclosure.
Figure 4:
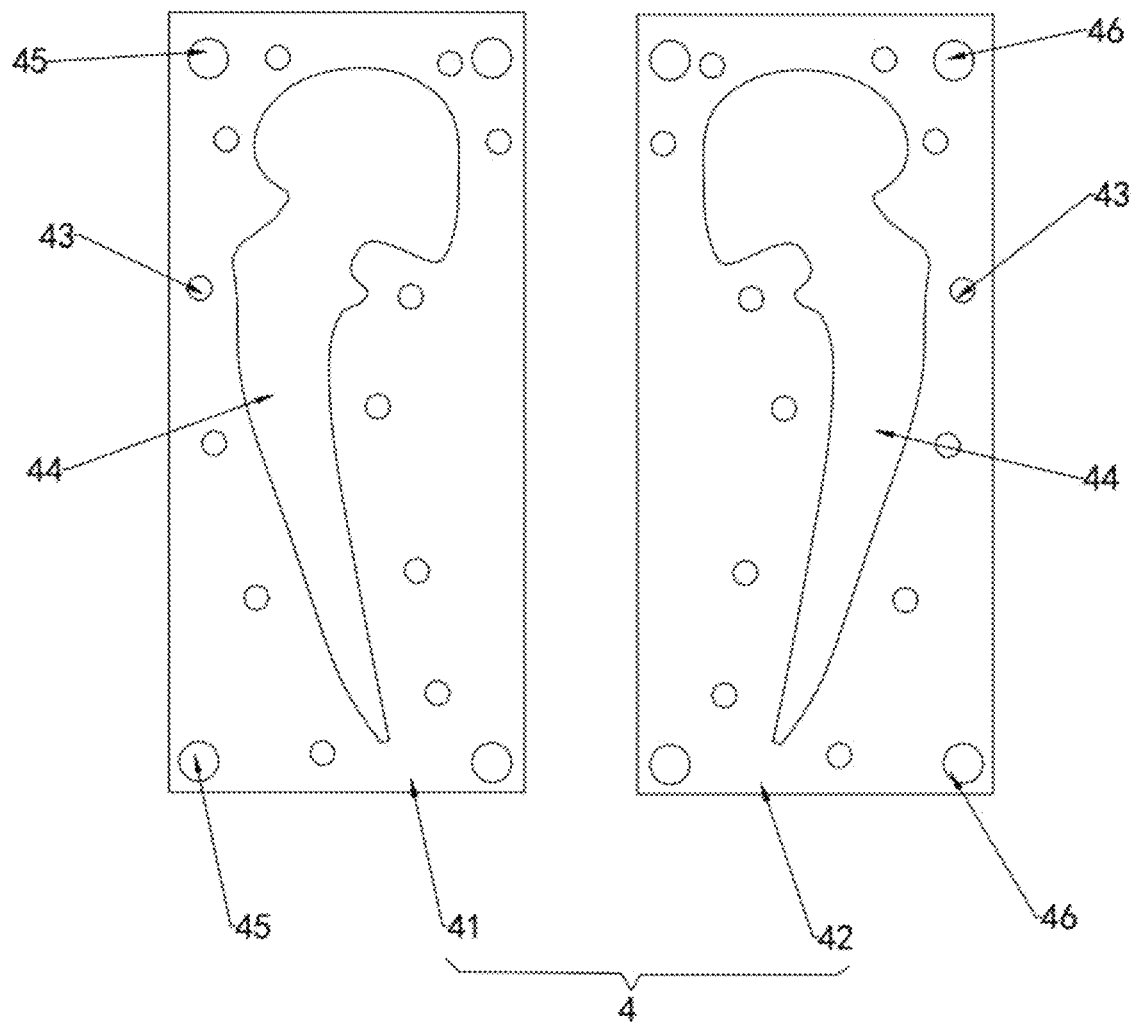
FIG. 4 is a schematic plan view of a reverse mold of a hip joint bone cement placeholder placed into a preparation method according to the present disclosure.
Figure 5:
FIG. 5 is an X-ray diagram of a hip joint bone cement placeholder in actual use.

Please refer to FIG. 3, the present disclosure discloses a hip joint bone cement placeholder, comprising the above-mentioned metal inner core for the hip joint bone cement placeholder and an antibiotic bone cement shell 3, the antibiotic bone cement shell 3 wraps the metal inner core, and a volume of the metal inner core is 50%-80% of a volume of the antibiotic bone cement shell 3. A quasi-femoral-shaped hip bone cement placeholder also includes a head portion, a neck portion and a handle portion, an outer contour of the neck portion is circular, an outer contour of the head portion is in a circular shape, an outer contour of the neck portion is in a columnar shape, and an outer contour of the handle portion is in a circular truncated cone shape or a cone shape, which is larger than the size of the metal core.

The present disclosure also discloses a preparation method of a hip joint bone cement placeholder, being used for preparing the above-mentioned hip joint bone cement placeholder, as show in FIG. 6, and comprises the following steps:

Step 1, preparing a placeholder model obtaining joint prosthesis contour data, performing reduction adjustment of 10%-15% of joint prosthesis contour data to obtain contour data of the placeholder model, and obtaining contour data of the placeholder model for 3D printing to obtain the placeholder model;

specifically, taking femoral head replacement as an example, the method for obtaining joint prosthesis contour data is as follows:

CT scans the patient's hip joint data, which is then imported into Mimics modeling software. Through morphological processing, a visual three-dimensional hip joint model is generated. This three-dimensional hip joint model undergoes mesh optimization in Geomagic software to obtain a solid model of the hip joint. Since thorough debridement and implantation of the new prosthesis are completed during the first-stage surgery, a solid model of the femoral prosthesis can also be acquired, and its contour data can be extracted based on this solid model of the femoral prosthesis.

And the above-mentioned 10%-15% reduction ratio is the result of actual verification. On the one hand, reducing the size makes it more convenient for implantation surgery; on the other hand, it can ensure that the placeholder is not easy to fall off.

Figure 7:
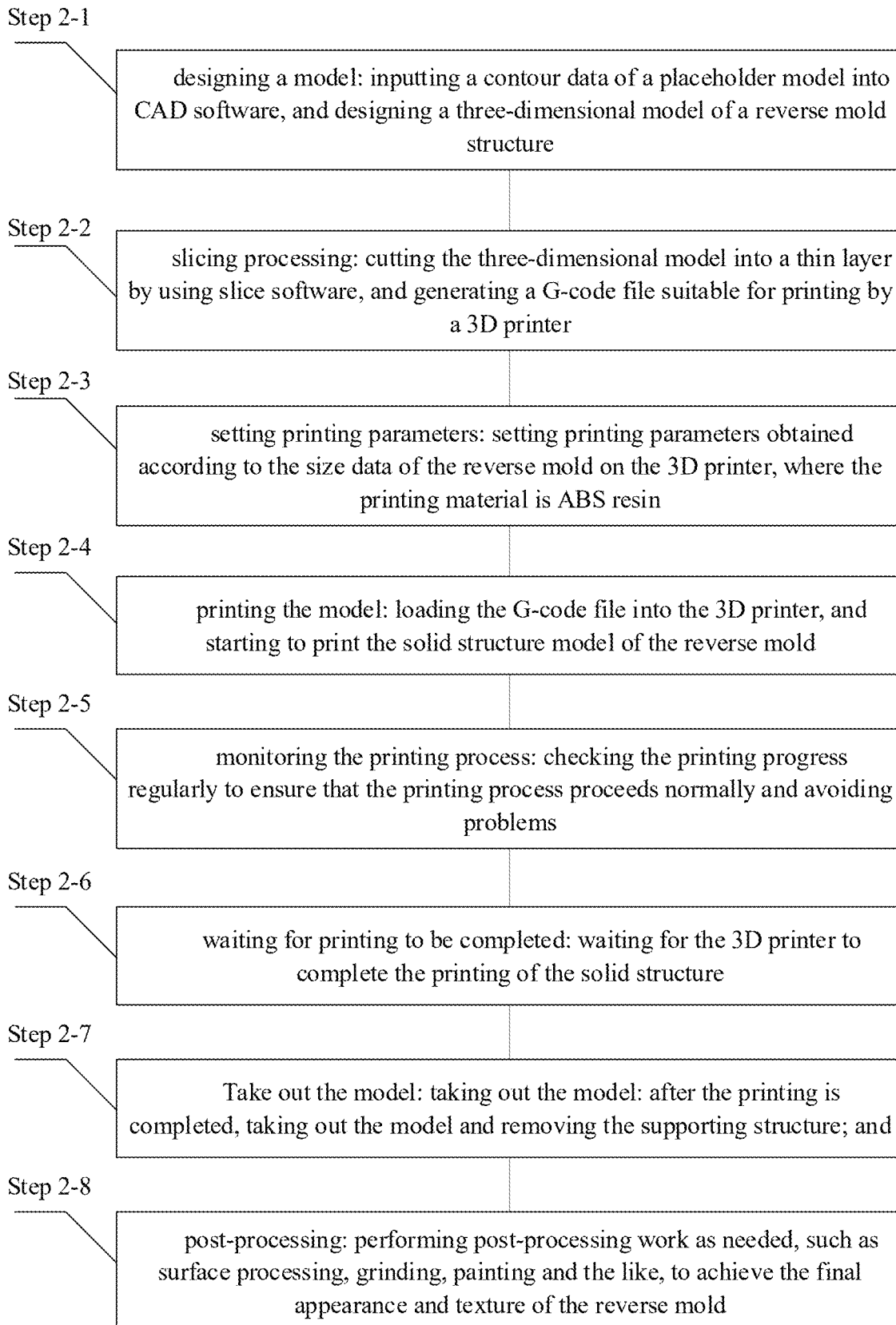
FIG. 7 is a schematic diagram of a specific sub-steps of reverse mold preparation.

Step 2, preparing a reverse mold carrying out reverse mode design according to contour data of the placeholder model, obtaining size data of the reverse mold, taking ABS resin as a stacking material, obtaining size data of the reverse mold for 3D printing to obtain the reverse mold comprising a first mold and a second mold;

specifically, taking the reverse mold of the femoral prosthesis as an example, as show in FIG. 7, the specific sub-steps of reverse mold preparation are as follows:

Step 2-1, designing a model: inputting a contour data of a placeholder model into CAD software, and designing a three-dimensional model of a reverse mold structure;

Step 2-2, slicing processing: cutting the three-dimensional model into a thin layer by using slice software, and generating a G-code file suitable for printing by a 3D printer;

Step 2-3, setting printing parameters: setting printing parameters obtained according to the size data of the reverse mold on the 3D printer, where the printing material is ABS resin;

Step 2-4, printing the model: loading the G-code file into the 3D printer, and starting to print the solid structure model of the reverse mold;

Step 2-5, monitoring the printing process: checking the printing progress regularly to ensure that the printing process proceeds normally and avoiding problems;

Step 2-6, waiting for printing to be completed: waiting for the 3D printer to complete the printing of the solid structure;

Step 2-7, Take out the model: taking out the model: after the printing is completed, taking out the model and removing the supporting structure; and Step 2-8, post-processing: performing post-processing work as needed, such as surface processing, grinding, painting and the like, to achieve the final appearance and texture of the reverse mold.

Figure 8:
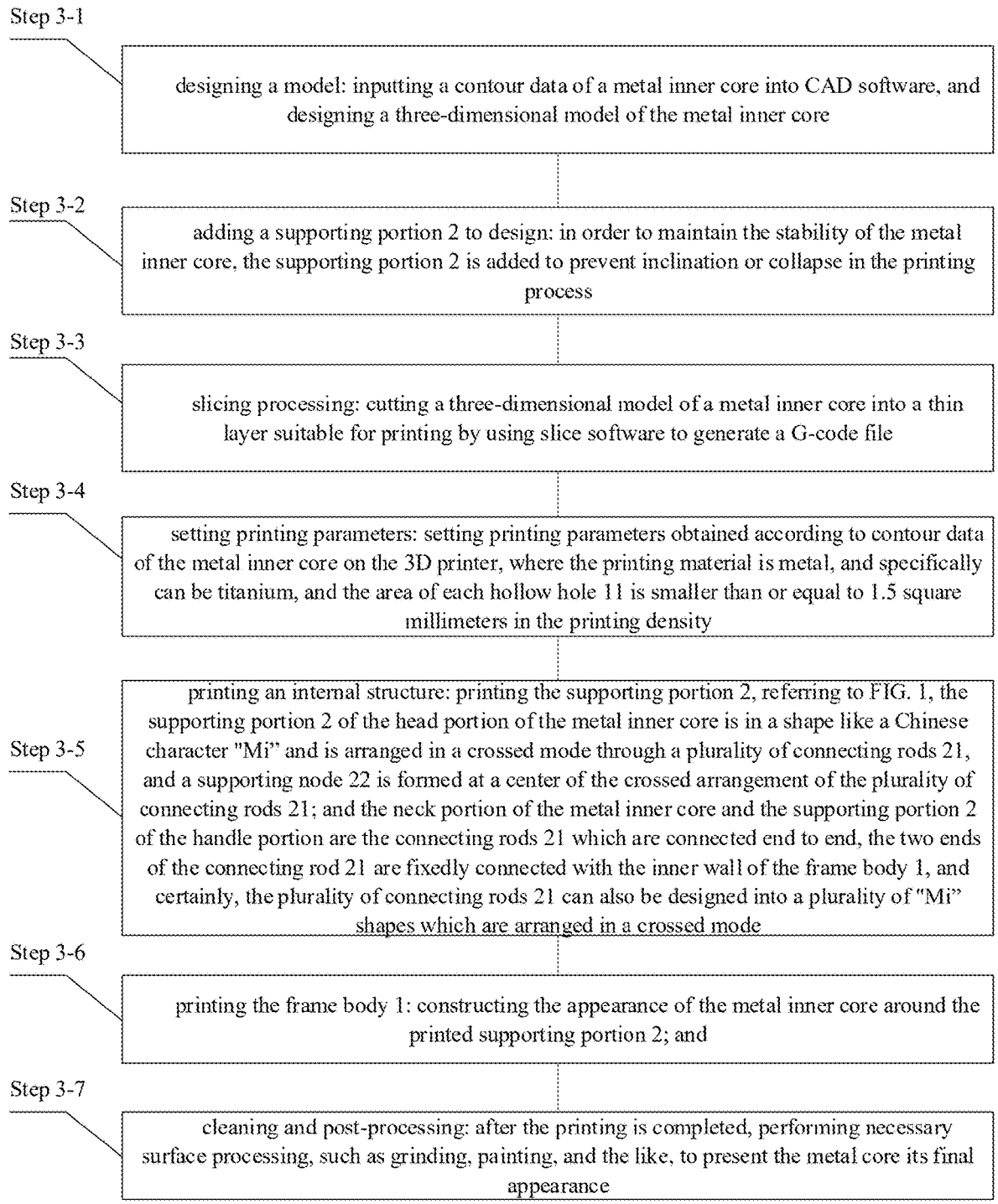
FIG. 8 is a schematic diagram of specific sub-steps of the metal inner core 3D printing.

Step 3, preparing a metal inner core performing reduction adjustment of 18%-25% of contour data of the placeholder model to obtain contour data of the metal inner core, and obtaining contour data of the metal inner core for 3D printing to obtain the metal inner core;

Specifically, taking the metal inner core in a femoral prosthesis shape as an example, as show in FIG. 8, the specific sub-steps of the metal inner core 3D printing are as follows:

Step 3-1, designing a model: inputting a contour data of a metal inner core into CAD software, and designing a three-dimensional model of the metal inner core;

Step 3-2, adding a supporting portion 2 to design: in order to maintain the stability of the metal inner core, the supporting portion 2 is added to prevent inclination or collapse in the printing process;

Step 3-3, slicing processing: cutting a three-dimensional model of a metal inner core into a thin layer suitable for printing by using slice software to generate a G-code file;

Step 3-4, setting printing parameters: setting printing parameters obtained according to contour data of the metal inner core on the 3D printer, where the printing material is metal, and specifically can be titanium, and the area of each hollow hole 11 is smaller than or equal to 1.5 square millimeters in the printing density;

Step 3-5, printing an internal structure: printing the supporting portion 2, referring to FIG. 1, the supporting portion 2 of the head portion of the metal inner core is in a shape like a Chinese character "Mi" and is arranged in a crossed mode through a plurality of connecting rods 21, and a supporting node 22 is formed at a center of the crossed arrangement of the plurality of connecting rods 21; and the neck portion of the metal inner core and the supporting portion 2 of the handle portion are the connecting rods 21 which are connected end to end, the two ends of the connecting rod 21 are fixedly connected with the inner wall of the frame body 1, and certainly, the plurality of connecting rods 21 can also be designed into a plurality of "Mi" shapes which are arranged in a crossed mode;

Step 3-6, printing the frame body 1: constructing the appearance of the metal inner core around the printed supporting portion 2; and Step 3-7, cleaning and post-processing: after the printing is completed, performing necessary surface processing, such as grinding, painting, and the like, to present the metal core its final appearance.

The above-mentioned 18%-25% reduction ratio is to enable the bone cement to completely wrap the metal inner core.

Step 4, preparing a bone cement placeholder putting the metal inner core into the first mold or the second mold, filling liquid antibiotic bone cement in the first mold with the metal inner core or the second mold with the metal inner core, and the first mold without the metal inner core or the second mold without the metal inner core both needs to be filled with liquid antibiotic bone cement, scraping the antibiotic bone cement in the first mold and the second mold, tightly buckling the first mold and the second mold, and separating the first mold from the second mold after waiting for solidification to obtain the bone cement placeholder.

Further, in Step 1, the hip joint prosthesis is divided into a head portion, a neck portion and a handle portion; and the steps includes obtaining hip joint prosthesis contour data, performing 15% reduction adjustment on the head contour data and the handle contour data of the hip joint prosthesis, keeping the neck contour data unchanged, obtaining contour data of the placeholder model, and obtaining contour data of the placeholder model for 3D printing to obtain the placeholder model.

Further, in Step 3, the placeholder model is divided into a head portion, a neck portion and a handle portion; and the steps includes performing 20% reduction adjustment on the head contour data and the handle contour data of the placeholder model, keeping the neck data unchanged, obtaining contour data of the metal inner core, and obtaining contour data of the metal inner core for 3D printing to obtain the metal inner core.

The reason why the neck contour data needs to be unchanged is because the neck contour data remains unchanged, which can keep the eccentricity of the placeholder unchanged, so that joint dislocation is less likely to occur after the placeholder is implanted.

Further, in the step S2, both the first mold and the second mold include a plurality of heat dissipation holes and recessed positions. The recessed position is the position where bone cement is placed. The recessed position also has a head portion, a neck portion and a handle portion, the heat dissipation holes are used for cavity flow to assist bone cement to solidify, the first mold or the second mold is provided with a plurality of connecting holes, the first mold or the second mold is provided with a plurality of connecting columns, the connecting holes and the connecting columns are arranged at an included angle of the first mold or the second mold, and the connecting holes and the connecting columns are symmetrically arranged; and one of the plurality of heat dissipation holes is provided around one of the plurality of recessed positions, one of the plurality of connecting columns is detachably installed in one of the plurality of connection holes, and the assembly and separation between the first mold and the second mold are more conveniently and rapidly achieved through the structural arrangement of the connecting column and the connecting hole. Therefore, the dimensional data of the reverse mold mentioned above include the shape of the reverse mold, the contour length of the reverse mold, the contour thickness of the reverse mold, the contour height of the reverse mold, the diameter of the heat dissipation hole in the reverse mold and the head diameter of the recessed position in the reverse mold, the length and width of the neck in the recessed position in the reverse mold and the upper and lower base of the handle in the recessed position in the reverse mold are the lengths on both sides.

Further, in Step 4, before filling the liquid antibiotic bone cement into the first mold with the metal inner core or the second mold with the metal inner core, a layer of Vaseline is first applied to the first mold and the second mold, and the placeholder is taken out after the bone cement is solidified by applying Vaseline.

Further, in Step 4, the liquid antibiotic bone cement includes bone cement powder, bone cement monomer liquid and antibiotics, wherein a weight ratio of bone cement powder, bone cement monomer liquid and antibiotics is 100:50:9, and the mixture is stirred for 60 s, so that the bone cement powder, the bone cement monomer liquid and the antibiotics are fully mixed. Specifically, for a normal-shaped femur, 40 g of bone cement powder, 20 mL of bone cement monomer liquid, and 3.6 g of antibiotics are mixed in proportions. Studies have shown that at least 3.6 g of antibiotics are added into every 40 g of bone cement, so that the good antibacterial effect of muscles and bone infections can be achieved, and continuous release of antibiotics can be kept.

The above-mentioned contour data includes shape, diameter, length, width, side length, etc. that constitute the contour.

The following are clinical data:

from January 2018 to June 2023, a total of 18 patients (18 hips) were diagnosed with periprosthetic infection after artificial half/total hip replacement. After thorough debridement, antibiotic bone cement placeholders containing metal cores were implanted, with 8 males and 10 females, aged from 49 to 88 years old, with an average age of (72.5±6.5) years old. After the implantation of antibiotic bone cement placeholders containing metal cores, the placeholders were used at different time points (2 days postoperative, and 1, 3, and 6 months) to conduct clinical efficacy analysis on the patient's wound healing status, hip X-ray examination, white blood cells, erythrocyte sedimentation rate, high-sensitivity C-reactive protein and hip joint function Harris score.

Results: the wounds of all patients healed 2 weeks after surgery, and there was no residual sinus opening. The white blood cells, erythrocyte sedimentation rate, and high-sensitivity C-reactive protein were reviewed 6 weeks after surgery and were all within the normal range. The hip function Harris score (see Table 1). The score increased from 40.0+ 3.6 before surgery to 80.6±4.5 at 6 months after surgery. Follow-up X-rays showed no dislocation, breakage, subsidence or acetabulum penetration of the placeholder. Twelve patients successfully underwent hip revision surgery, with good postoperative functional recovery. Another 6 patients who were older, in poor physical condition, and fearful of revision surgery, used the placeholder as the ultimate treatment. At the last follow-up, there was dislocation, breakage, subsidence or acetabulum penetration of the placeholder, but the hip joint function was good.

TABLE 1

Comparison of Harris scores in different periods (x ± s)

| Pre-operative (score) | 2 weeks postoperative (score) | 1 month postoperative (score) | 3 months postoperative (score) | 6 months postoperative (score) |
|---|---|---|---|---|
| 40.2 ± 3.6 | 65.5 ± 5.9 | 75.6 ± 6.8 | 78.5 ± 5.9 | 80.6 ± 4.5 |

In summary, the bone cement placeholder of the present disclosure can effectively resist infection, restore hip function, and achieve good clinical results. It can also be used as the ultimate treatment for some older patients, in poor physical condition, and fear of revision surgery.

The above-described embodiment only expresses one embodiment of the present disclosure, and the description thereof is relatively specific and detailed, but it should not be understood as limiting the patent scope of the present disclosure. It should be noted that, for those of ordinary skill in the art, several modifications and improvements can be made without departing from the concept of the present disclosure, and these all belong to the protection scope of the present disclosure. Therefore, the scope of protection of the patent of the present disclosure should be determined by the appended claims.

What is claimed is:

1. A preparation method of a hip joint bone cement placeholder, wherein the hip joint bone cement placeholder comprises a metal inner core for a hip joint bone cement placeholder and an antibiotic bone cement shell; the metal inner core for a hip joint bone cement placeholder, comprises a frame body and a supporting portion, the supporting portion is arranged in the frame body, the supporting portion and the frame body integrally form a hollow metal inner core, and the frame body and the supporting portion are both made of metal materials; the supporting portion includes a plurality of connecting rods, a supporting node is formed in a center of the plurality of connecting rods in a crossed mode, and two ends of one of the plurality of connecting rods are fixedly connected to an inner wall of the frame body; and the frame body is divided into a head portion, a neck portion and a handle portion, an outline of the frame body is a quasi-femoral shape, the head portion is in a circular shape, the neck portion is in a columnar shape, and the handle portion is in a circular truncated cone shape or a cone shape; the antibiotic bone cement shell wraps the metal inner core, and a volume of the metal inner core is 50%-80% of a volume of the antibiotic bone cement shell, and the preparation method comprises the following steps:

Step 1, preparing a placeholder model
obtaining hip joint prosthesis contour data, performing reduction adjustment of 10%-15% of hip joint prosthesis contour data to obtain contour data of the placeholder model, and obtaining contour data of the placeholder model for 3D printing to obtain the placeholder model;

Step 2, preparing a reverse mold
carrying out reverse mode design according to contour data of the placeholder model, obtaining size data of the reverse mold, taking ABS resin as a stacking material, obtaining size data of the reverse mold for 3D printing to obtain the reverse mold comprising a first mold and a second mold;

Step 3, preparing a metal inner core
performing reduction adjustment of 18%-25% of contour data of the placeholder model to obtain contour data of the metal inner core, and obtaining contour data of the metal inner core for 3D printing to obtain the metal inner core; and Step 4, preparing a bone cement placeholder
putting the metal inner core into the first mold or the second mold, filling liquid antibiotic bone cement in the first mold with the metal inner core or the second mold with the metal inner core, wherein the first mold without the metal inner core or the second mold without the metal inner core needs to be filled with liquid antibiotic bone cement, tightly buckling the first mold and the second mold, and separating the first mold from the second mold after waiting for solidification to obtain the bone cement placeholder.

2. The preparation method of the hip joint bone cement placeholder according to claim 1, wherein in Step 1, the hip joint prosthesis is divided into a head portion, a neck portion and a handle portion; and the steps includes obtaining hip joint prosthesis contour data, performing 15% reduction adjustment on the head contour data and the handle contour data of the hip joint prosthesis, keeping the neck contour data unchanged, obtaining contour data of the placeholder model, and obtaining contour data of the placeholder model for 3D printing to obtain the placeholder model.

3. The preparation method of the hip joint bone cement placeholder according to claim 2, wherein in Step 3, the placeholder model is further divided into a head portion, a neck portion and a handle portion; and the steps includes performing 20% reduction adjustment on the head contour data and the handle contour data of the placeholder model, keeping the neck data unchanged, obtaining contour data of the metal inner core, and obtaining contour data of the metal inner core for 3D printing to obtain the metal inner core.

4. The preparation method of the hip joint bone cement placeholder according to claim 1, wherein in Step 2, the first mold and the second mold both include a plurality of heat dissipation holes and a plurality of recessed positions, the first mold or the second mold is provided with a plurality of connecting holes, and the first mold or the second mold is provided with a plurality of connecting columns; the connecting holes and the connecting columns are arranged at an included angle of the first mold or the second mold, and the connecting holes and the connecting columns are symmetrically arranged; and one of the plurality of heat dissipation holes is provided around one of the plurality of recessed positions, and one of the plurality of connecting columns is detachably installed in one of the plurality of connection holes.

5. The preparation method of the hip joint bone cement placeholder according to claim 4, wherein in Step 4, before filling the liquid antibiotic bone cement into the first mold with the metal inner core or the second mold with the metal inner core, a layer of Vaseline is first applied to the first mold and the second mold.

6. The preparation method of the hip joint bone cement placeholder according to claim 5, wherein in Step 4, the antibiotic bone cement in a solution state includes bone cement powder, bone cement monomer liquid and antibiotics, wherein a weight ratio of bone cement powder, bone cement monomer liquid and antibiotics is 100:50:9, and the mixture is stirred for 60 s, so that the bone cement powder, the bone cement monomer liquid and the antibiotics are fully mixed.

* * * * *